United States Patent
Stevens et al.

(10) Patent No.: US 9,049,841 B2
(45) Date of Patent: Jun. 9, 2015

(54) CUSHIONING DEVICE FOR LARGE ANIMALS

(76) Inventors: Jason Stevens, Elmira (CA); Robert Nugteren, Bloomingdale (CA); Jack Bosman, Kitchener (CA); Andrew Jenkins, London (CA)

(*) Notice: Subject to any disclaimer, the term of this patent is extended or adjusted under 35 U.S.C. 154(b) by 59 days.

(21) Appl. No.: 13/508,285

(22) PCT Filed: Nov. 5, 2010

(86) PCT No.: PCT/CA2010/001742
§ 371 (c)(1),
(2), (4) Date: Jul. 10, 2012

(87) PCT Pub. No.: WO2011/054091
PCT Pub. Date: May 12, 2011

(65) Prior Publication Data
US 2012/0266822 A1    Oct. 25, 2012

Related U.S. Application Data (60) Provisional application No. 61/258,309, filed on Nov. 5, 2009.

(51) Int. Cl.
| | |
|---|---|
| A01K 29/00 | (2006.01) |
| B68G 5/00 | (2006.01) |
| A47C 16/00 | (2006.01) |
| A47G 9/06 | (2006.01) |
| A01K 1/015 | (2006.01) |

(52) U.S. Cl.
CPC .................................. *A01K 1/0157* (2013.01)

(58) Field of Classification Search
USPC ............... 119/28.5, 19, 171; D30/118; 5/706, 5/710–713, 655.3, 655.5, 909, 654, 644, 5/709, 910, 913, 420, 731, 417
See application file for complete search history.

(56) References Cited

U.S. PATENT DOCUMENTS

| | | | |
|---|---|---|---|
| 4,371,999 A | | 2/1983 | Reid |
| 4,456,642 A | * | 6/1984 | Burgdorfer et al. .............. 428/68 |
| 5,044,030 A | * | 9/1991 | Balaton .............................. 5/710 |
| 5,632,051 A | * | 5/1997 | Stanley et al. .................... 5/636 |
| 5,653,195 A | | 8/1997 | Young |
| 6,152,077 A | * | 11/2000 | Bristow ........................ 119/28.5 |

(Continued)

FOREIGN PATENT DOCUMENTS

| | | |
|---|---|---|
| CA | 2253417 A1 | 11/1997 |
| FR | 2886 514 A1 | 12/2006 |

(Continued)

*Primary Examiner* — Andrea Valenti
(74) *Attorney, Agent, or Firm* — Eduardo Krupnik (57) ABSTRACT

The present invention relates to a cushioning device for supporting a large animal such as a cow or a horse. The cushioning device comprises a top surface, a bottom surface, said top surface and bottom surface forming a chamber, and an amount of a gelatinous filling material disposed within the chamber. The present invention relates also to methods of transporting and installing a cushioning device for supporting a large animal. The method comprises transporting the cushioning device and a compound capable of creating a gel upon contact with a liquid may be delivered separately to the site. At the remote site the compound may be disposed within the chamber and the chamber may then be filled with an amount of liquid to create the gel within the cushioning device. The compound may also be delivered to the site already disposed within the chamber.

13 Claims, 4 Drawing Sheets

(56) References Cited

U.S. PATENT DOCUMENTS

| | | | |
|---|---|---|---|
| 6,402,775 B1* | 6/2002 | Bieberich | 607/104 |
| 6,568,011 B2 | 5/2003 | Fisher et al. | |
| 6,935,273 B2 | 8/2005 | Throndsen et al. | |
| 7,921,807 B2* | 4/2011 | Arvanites | 119/28.5 |
| 8,252,199 B2* | 8/2012 | Copelli Yanez | 252/70 |
| 8,302,562 B2* | 11/2012 | Reusche et al. | 119/28.5 |
| 2005/0076855 A1* | 4/2005 | Throndsen et al. | 119/526 |
| 2010/0274332 A1* | 10/2010 | Hirakawa | 607/114 |
| 2012/0291711 A1* | 11/2012 | Baker et al. | 119/28.5 |

FOREIGN PATENT DOCUMENTS

| | | | | |
|---|---|---|---|---|
| JP | 10-094459 | * | 4/1998 | A47C 27/00 |
| JP | 10094459 A | | 4/1998 | |
| KR | 20020003585 A | | 1/2002 | |
| WO | WO 00/18219 A1 | | 4/2000 | |

* cited by examiner

CUSHIONING DEVICE FOR LARGE ANIMALS

CROSS REFERENCE TO RELATED APPLICATIONS

This application is a national stage application under 35 U.S.C. 371 of International Application No. PCT/CA2010001742, filed Nov. 5, 2010, which in turn claims the benefit under 35 U.S.C. 119(e) of U.S. Provisional Ser. No. 61/258,309, filed Nov. 5, 2009, the contents of each of which are hereby incorporated by reference into the present disclosure.

FIELD OF THE INVENTION

The present invention relates to cushioning devices, filling materials and to methods of transporting and installing cushioning devices. More particularly, the present invention relates to cushioning devices, such as mattresses, for supporting large animals and having a flatter surface for even cushioning, comfort and clean-ability, to the use of superabsorbent polymers as filling materials, and to the transportation and installation of the cushioning devices.

BACKGROUND OF THE INVENTION

Providing cows with comfort results in a significant increase in daily milk production. Comfort results in cows having less stress, eating more, and having overall less health problems. Hygiene also affects milk production.

After feeding, cows traditionally lie down in the pasture while chewing the cud, and there has been the problem that during severe winter weather and other periods of inclement weather when the cows are kept in a barn or similar structure the cows are uncomfortable and are not contented when lying down on a concrete or similarly hard floor of the barn. Furthermore, cows nowadays are typically being kept permanently in a barn or similar structure irrespective of the weather conditions. With the view to alleviating this problem various solutions have been proposed to render the feel of the concrete or similarly hard floor of the barn more akin to that of the pasture. Thus, for example, U.S. Pat. No. 5,653,195 (US '195) discloses an animal mattress comprising a fabric enclosure having a plurality of separate compartments within the enclosure, and comminuted resiliently deformable rubber from used vehicle tires disposed loose within each compartment. While such a mattress with compartments having comminuted rubber provides from the standpoint of the cow a degree of resiliency and feel which is very similar to that of the pasture, this alternative solution suffers from the disadvantage that the mattress has no internal structure, so each of the compartments expands to the natural maximum area, which is a circle. These circles provide uneven cushioning. The uneven surface also causes the mat to be more difficult to clean when used with cows or horses. The difficulty in cleaning can lead to poor health in the animals.

Another form of prior art is the air cushioning device with circular internal structure to limit the expansion when filled. This includes the typical air cushioning devices for human use or used as a spare bed. Air mattresses of the prior art use round vertical internal structures to help limit the flatness. Other types of air mattresses use tubes. For example see U.S. Pat. Nos. 4,371,999 and 6,568,011. These mattresses, however, are not designed to resist the weight imparted by large animals, such as cows or horses, and require regular refilling with air.

Air and water mattresses can be shipped in a small package to a remote site where the mattress can be filled with air or water at the remote site. However, mattresses other than air and water mattresses need to be shipped to the remote site with the filling material included in the mattress. These mattresses are, therefore, difficult to transport given their bulky structure.

What is needed is a cushioning device that is designed to create a substantially flat surface for cushioning that provides impact absorption and cushioning when lying down, that can withstand the weight of a large animal, such as a cow, that is comfortable for the animal, and that it is easier to transport and install. Keeping the surface of the mattress substantially flat may be important to ensure that the surface is easily cleanable, which helps the large animal stay healthy. What is also needed is a cushioning device for supporting a large animal which provides good cushioning, low shipping weight, low shipping volume, and easy installation.

SUMMARY OF THE INVENTION

It is an object of the present invention to provide a cushioning device that provides good cushioning to a large animal, low shipping weight, low shipping volume, and easy installation.

As such, in one aspect, the present invention provides for a cushioning device for supporting a large animal characterized in that said cushioning device comprises a top surface, a bottom surface, said top surface and bottom surface forming a chamber, and an amount of a gelatinous filling material disposed within the chamber.

In another aspect, the present invention provides for a method of transporting and installing a cushioning device for supporting a large animal at a site, said cushioning device comprising a top surface, a bottom surface, said top surface and bottom surface forming a chamber, and at least one port in communication with the chamber, characterized in that said method comprises: (a) transporting to the site the cushioning device and an effective amount of a compound capable of creating a gelatinous material when in contact with a liquid, and (b) installing the cushioning device at the site by disposing the compound into the chamber through the at least one port and by filling the chamber through the at least one port with the liquid to create the gelatinous filling material within the chamber, thereby installing the cushioning device at the site.

In another aspect, the present invention provides for a method of transporting and installing a cushioning device for supporting a large animal at a site, said cushioning device comprising a top surface, a bottom surface, said top surface and bottom surface forming a chamber, an amount of a compound disposed within the chamber, said compound being capable of creating a gelatinous filling material when in contact with a liquid, and at least one port in communication with the chamber, characterized in that said method comprises: (a) transporting to the site the cushioning device, and (b) installing the cushioning device at the site by filling the chamber through the at least one port with the liquid to create the gelatinous filling material within the chamber, thereby installing the cushioning device at the site.

In another aspect, the present invention provides for a kit, characterized in that said kit comprises: (a) cushioning device for supporting a large animal, said cushioning device comprising a top surface, a bottom surface, said top surface and bottom surface forming a chamber, and (b) an amount of a compound capable of creating a gelatinous filling material when in contact with a liquid. In aspects of the present invention the kit may further comprise instructions for disposing the compound within the chamber and for filling the chamber of the cushioning device with the liquid. In other aspects of the invention the kit may further comprise a cover for covering said cushioning device. In other aspects of the invention the kit may further comprise a bottom cover for covering said bottom surface, which may serve as a layer of protection for under the said cushioning device.

Advantages of the present invention include:
(a) a cushioning device having a flatter surface for comfort and clean-ability;
(b) a cushioning device having a more consistent pattern without low spots;
(c) use of gel powder to facilitate the packaging, transporting and installing of the cushioning device at a remote site.

BRIEF DESCRIPTION OF THE DRAWINGS

The invention will be better understood and objects of the invention will become apparent when consideration is given to the following detailed description thereof. Such description makes reference to the annexed drawings wherein.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE INVENTION

Unless defined otherwise, all technical and scientific terms used herein have the same meaning as commonly understood by one of ordinary skill in the art to which this invention belongs. Also, unless indicated otherwise, except within the claims, the use of "or" includes "and" and vice-versa. Non-limiting terms are not to be construed as limiting unless expressly stated or the context clearly indicates otherwise (for example "including", "having" and "comprising" typically indicate "including without limitation"). Singular forms including in the claims such as "a", "an" and "the" include the plural reference unless expressly stated otherwise.

The invention will be explained in details by referring to the figures. Although the figures show a cushioning device in the form of a mattress, the cushioning device of the present invention may include mattresses, pads, mats or pillows.

Figure 1:
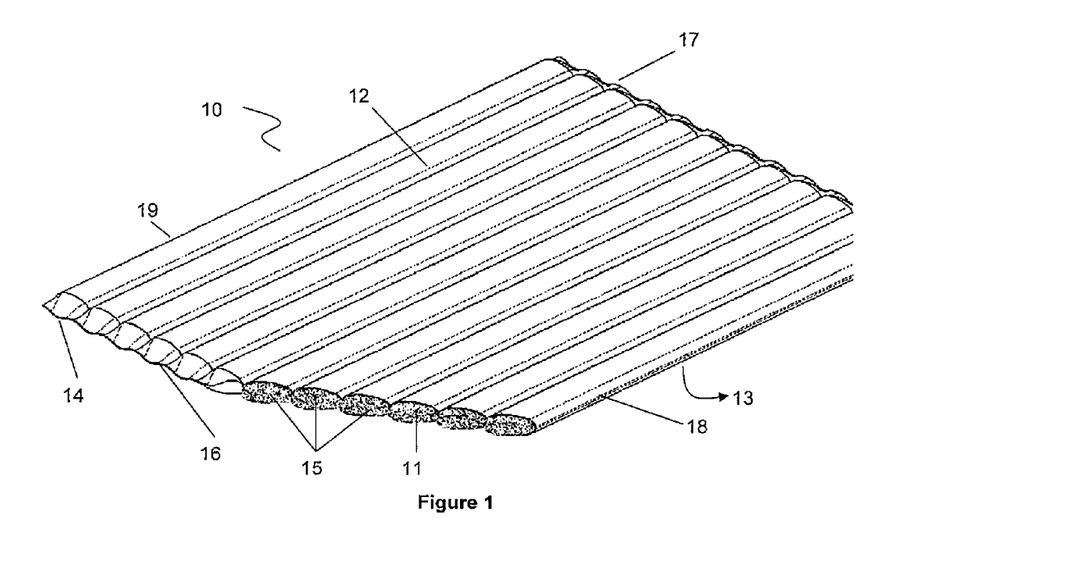
FIG. 1 illustrates an isometric perspective view in partial cutaway showing the cushioning device in accordance to one embodiment of the present invention.

With reference to FIG. 1, reference numeral 10 denotes generally a cushioning device for supporting large animals of the current invention. The cushioning device 10 may comprise a top or first surface 12, and a bottom or second surface 13. The top and bottom surfaces 12, 13 may form a chamber 11. Disposed within the chamber 11 is a gelatinous filling material for filling the chamber 11 of the cushioning device 10. Reference numeral 11 denotes the chamber of the cushioning device 10 with the gelatinous filling material disposed therein. Large animals may include cows, horses, pigs, sheep, buffalo, or goat.

As illustrated in FIG. 1 the cushioning device 10 may comprise parallel opposing top and bottom edges 16 and 17, and parallel opposing side edges 18 and 19, with the side edges 18 and 19 being perpendicular to the top and bottom edges 16 and 17.

To form the chamber, the top and bottom surfaces 11, 12 may be connected at their peripheral ends throughout the periphery of the cushioning device 10 to form a structure 14. It may be necessary to seal the chamber to prevent the gelatinous filling material from leaking out of the cushioning device. In this case, the top and bottom surfaces 11, 12 may be connected directly at their peripheral ends by sealed end seams in order to create the sealed chamber. Alternatively, the top and bottom surfaces may be connected at their peripheral ends to side walls by sealed end seams (not shown in the figures).

In a preferred embodiment, the chamber 11 may include a plurality of separate compartments 15, as illustrated in FIG. 1. The number of compartments 15 in the cushioning device 10 may be varied to create different thicknesses and dimensions of the cushioning device 10. In another embodiment, the chamber may be comprised of a single compartment (not shown in the figures).

The plurality of compartments in the chamber of the cushioning device of the present invention may be formed by providing the chamber with dividers located between the top and bottom surfaces of the cushioning device, which divide the chamber into the plurality of compartments. Each divider runs substantially longitudinally from the top edge to the bottom edge of the cushioning device, and substantially parallel to the side edges of the cushioning device. The dividers may be spaced equidistant from one another thereby forming compartments of substantially similar size.

Figure 6:
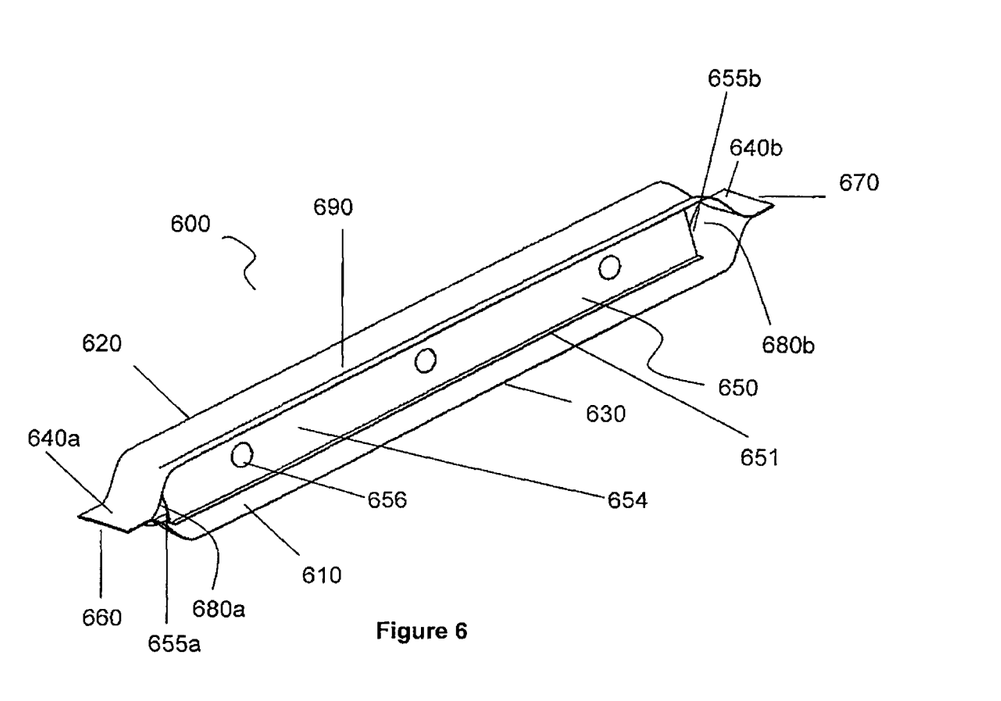
FIG. 6 illustrates a longitudinal (from top edge to bottom edge) cross section of the cushioning device in accordance to one embodiment of the present invention showing a divider.

With reference to the embodiment shown in FIG. 6 illustrated is a longitudinal (from top edge to bottom edge of the cushioning device) cross section through a cushioning device 600 showing one divider 650. The cushioning device 600 comprises a top surface 620, a bottom surface 630, the top and bottom surfaces 620 and 630 forming a chamber 610, a top edge 660 and a bottom edge 670. Reference numerals 640*a* and 640*b* denote the peripheral structure which may be formed by the connection between the top and bottom surfaces 620 and 630 at the top and bottom edges 660 and 670 of the cushioning device 600. In one aspect of the present invention, divider 650 may take the form of an I-beam comprising a pair of elongate parallel flange members (only bottom flange 651 is shown in FIG. 6), interconnected by a generally planar web member 654. Web member 654 may comprise of two opposite ends 655*a* and 655*b* along its longitudinal axis. Divider 650 may run from the top edge 660 to the bottom edge 670. In the embodiment illustrated in FIG. 6, the opposite ends 655*a* and 655*b* of the web member 654 do not reach the top and bottom edges 660 and 670 of the cushioning device 600 thereby leaving two openings 680*a* and 680*b* proximate to the top and bottom edges 660 and 670, which may allow the gelatinous filling material or liquid solution used to create the gelatinous material to move around the opposite ends 655a and 655b of the divider 650 and flow amongst the compartments of the chamber. The planar web member 654 may include one or more perforation means 656, such as passageways or holes, to allow for the gelatinous filling material or a liquid solution used to create the gelatinous filling material within the chamber to flow easier amongst the separate compartments. Divider 650 may be connected to the top and bottom surfaces 620 and 630 by connecting one flange member to the top surface 620 and connecting the other flange member 651 to the bottom surface 630. Connection between the two surfaces 620 and 630 to the flange members may be made by seams, which seal each divider 650 to the top and bottom surfaces 620 and 630. The seams can lie made by, for example, heat sealing, gluing or any other method of attachment. Divider 650 may be made of a number of suitable materials, including, any suitable plastic, vinyl, or rubber. Reference numeral 690 denotes a longitudinal line formed as a result of the seam connecting the top surface 620 to a flange member.

A top cover may go on top of the cushioning device to protect the cushioning device from the large animal and give a substantially smooth and even surface. A bottom cover, which may be an extension of the top cover, may be used underneath the cushioning device to reduce abrasion against the concrete floor of the stall or any other place where the cushioning device is placed.

The cushioning device of the present invention may be manufactured using liquid impervious materials, which may be strong enough to support the weight of large animals such as cows and horses. The cushioning device may, for example, be made from a plastic or rubber material or composite materials. Various materials may be acceptable to manufacture the cushioning device of the present invention. Preferably, the material may have a small amount of stretch for the functionality of the cushioning device. The material may be capable of stretching between about 0.1% to about 10% of its original size. In a preferred configuration, reinforced polyvinyl chloride (PVC) may be used to manufacture the cushioning device of the present invention. In one aspect the top surface of the cushioning device is made of reinforced PVC or other suitable material capable of stretching up to 10% of the original size of the top surface. The bottom surface may also be made of reinforced PVC or other suitable material capable of stretching up to 10% of the original size of the bottom surface.

In one embodiment of the present invention, the gelatinous filling material may be provided as a compound that creates a gel when in contact with a liquid solution such as water. Examples of such a compound for creating the gelatinous material may include superabsorbent polymers (SAP). SAP is commonly used in the hygiene industry, particularly in the manufacture of diapers to absorb body fluids. As such, a preferred material for providing a gelatinous filling material may be in the form of a powder or granules made up of SAP, and the powder or granules may be interspersed throughout the chamber. An example may be the sodium polyacrylate AP95 OS produced by Evonik Stockhousenr®.

When SAP is in contact with a liquid, such as water, it creates a gel that can last as a gelatinous material for many years when inside a sealed chamber.

SAP that may be used in the present invention include absorbent polymers that absorb liquids and are commonly used in the manufacture of sanitary articles. SAP that may be used in the present invention include polymers that absorb over 50 times, more preferably over 75 times, even more preferably over 100 times, its weight in water. Non-limiting examples of SAP that may be used according to the present invention include sodium polyacrylate, sodium polyacrylamide, and potassium polyacrylamide.

The high viscosity of the gelatinous filling material that may be included within the chamber of the cushioning device may create impact absorption to absorb energy peaks. Also, the conformability of the gel may help reduce the pressure points on joints or extremities of the large animal, which may result, in the case of cows, in an increase in the milk production.

The cushioning device of the present invention may include one or more ports for disposing in the chamber the compound capable of creating the gelatinous filling material when in contact with a liquid and for filling the chamber with liquids. In one embodiment, a standard port or valve may be provided on the cushioning device to permit entry and exit of the filling material and/or water from/to the chamber. In one embodiment, the port may be comprised of an inlet port and an outlet port.

Figure 2:
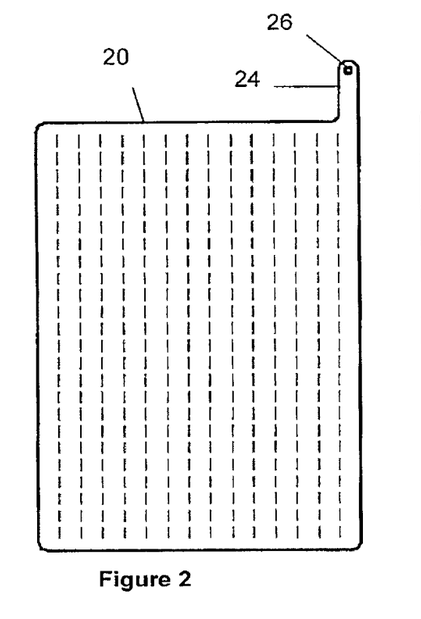
FIG. 2 illustrates a top view of a cushioning device in accordance with one embodiment of the present invention having a nozzle with only one port in the upper right hand corner on the cushioning device.
Figure 3:
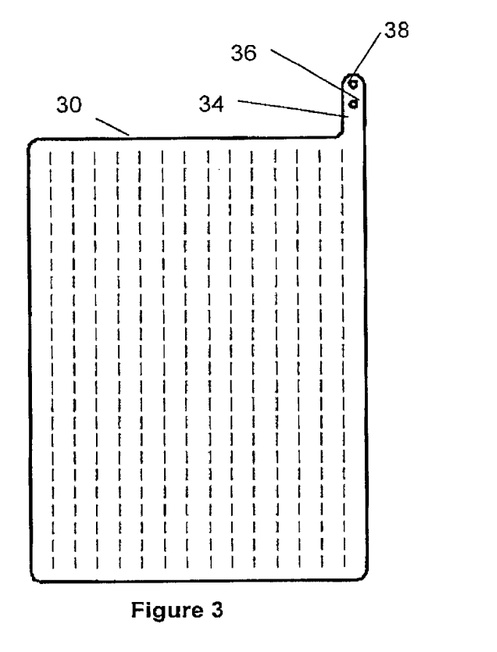
FIG. 3 illustrates a top view of a cushioning device in accordance with one embodiment of the present invention having two ports on the same nozzle: one port is for filling the cushioning device and the other port is for removing air from the cushioning device.
Figure 4:
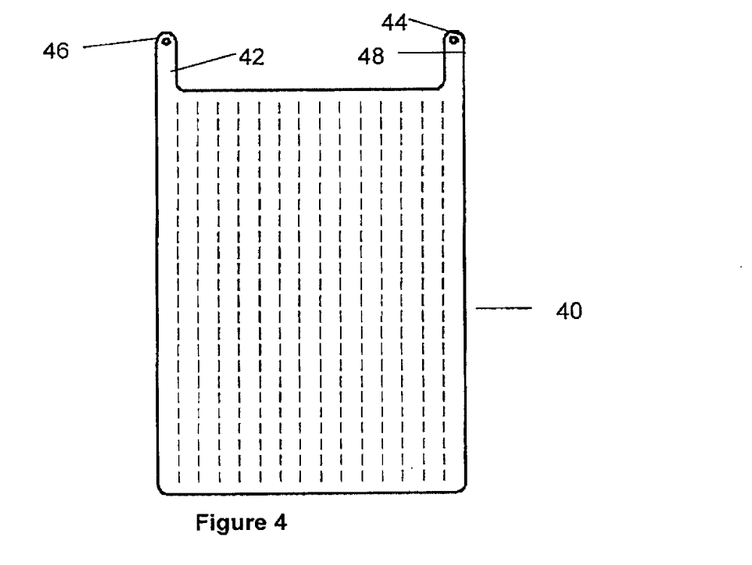
FIG. 4 illustrates a top view of a cushioning device in accordance with one embodiment of the present invention having two ports on different nozzles: one port is for filling and the other port is for removing air.

In another embodiment, the cushioning device of the present invention may be provided with a nozzle or extension from the cushioning device having one or more ports, each port being in communication with the chamber of the cushioning device. The ports may be used to dispose within the chamber a compound capable of creating a gel when in contact with a liquid, or for filling the chamber with a liquid. The extension or nozzle may be configured to extend from either the top or the bottom surfaces of the cushioning device. The extension may include one or two ports, as illustrated in FIGS. 2, 3 and 4. FIG. 2 illustrates one embodiment of the present invention where a cushioning device 20 is provided with a nozzle 24 with only one port 26 in one corner on the cushioning device 20.

FIG. 3 illustrates a top view of a cushioning device 30 in accordance with another embodiment of the present invention having two ports 36 and 38 on the same nozzle 34. One port may be for filling the cushioning device and the other port may be for removing air from the cushioning device. Generally, the port closer to the edge of the cushioning device (port 36 in FIG. 3) may be used for filling the chamber with water or any other liquid, while the port further away from the edge of the cushioning device may be used for removing air from the chamber (port 38 in FIG. 3).

FIG. 4 illustrates a top view of a cushioning device in accordance with another embodiment of the present invention having two ports 46 and 48 on two different nozzles 42 and 44. One port may be for filling the chamber and the other port may be for removing air from the chamber.

Once the chamber is filled with the filling material, the extension may then be securely folded so as to prevent the filling material from escaping the chamber.

In one embodiment of the invention, the gelatinous filling material may be disposed within the chamber, and the chamber of cushioning device may be closed immediately thereafter without the need of adding filling ports.

The cushioning device may be of sufficient size to support a large animal, such as a cow or a horse. In one embodiment of the present invention, the cushioning device may take a rectangular form with a width (length of the top and bottom edges) of about 48 inches, a length of the parallel side edges of about 66 inches, and a height (not shown) of about 2 inches. The nozzle may be of about 8 inches long, but it may range from about 2 inches to about 16 inches without changing too much. A person of ordinary skill in the art may understand that other sizes or shapes (such as rectangular or circular) may be used for the cushioning device of the invention. The chamber may include about twelve (12) compartments each of which may be approximately 4 inches in width.

Figure 5:
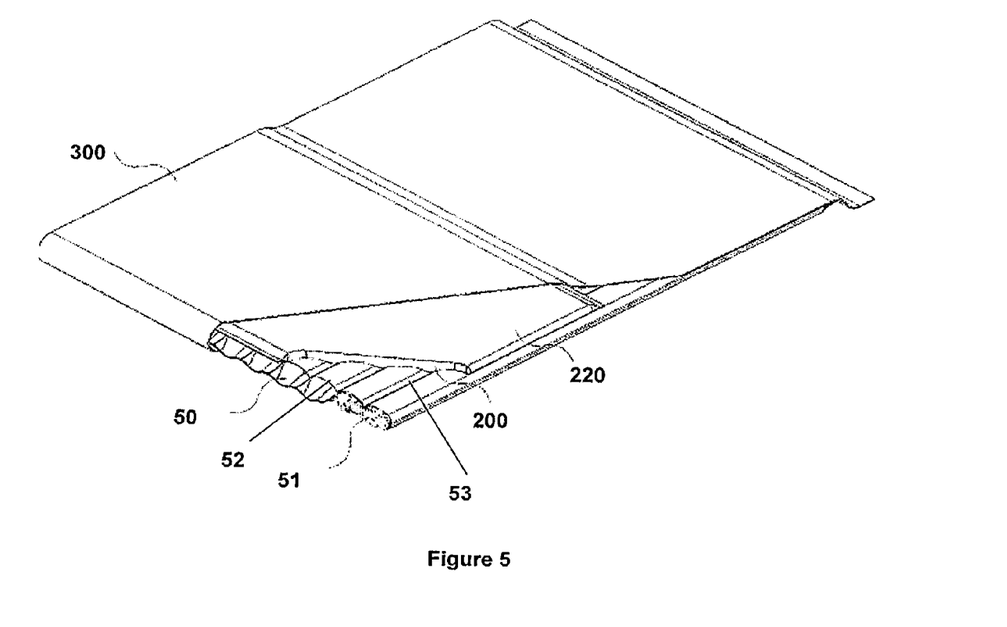
FIG. 5 illustrates an isometric perspective view in partial cutaway showing the cushioning device, a gel pad positioned atop of the cushioning device, and a cover according to one aspect of the present invention.

When provided with a plurality of compartments, at the point where the dividers attach to the top surface, ridges may be formed on the cushioning device. The ridges may interfere with the cleaning of the top surface of the cushioning device more difficult, which may lead to unsanitary conditions and poor animal health. As previously mentioned, a top cover may go on top of the cushioning device to protect the cushioning device from the large animal and to provide a substantially smooth and even surface. FIG. 5 illustrates a cushioning device 50 according to another embodiment of the present invention. In this embodiment of the present invention, a flexible pad 200, such as a gel pad, may be positioned to the top surface 52 of the cushioning device 50. The cushioning device 50 may include cells or compartments 51 with gelatinous filling material disposed inside therein. When positioned on top of the cushioning device 50, the flexible pad 200 may eliminate the ridges 53 created by the compartments 51 by conforming to the ridges 53 on the surface of the cushioning device 50. The top side 220 of the flexible pad 200 may be allowed to move freely and may tend to the natural state of being substantially flat.

The flexible pad 200 may be used to conform to the pattern of the cushioning device, such as the ridges 53 formed by the compartments of the cushioning device. The top side 220 of the flexible pad 200 may be flat to create a flatter cushioning surface for the resting large animal. The bottom side of the pad 200, which is opposite to the top side 220, substantially conforms to the patterns on the top surface 52 of the cushioning device 50. The flexible pad 200 may cover part or the entire cushioning device 50.

As illustrated in FIG. 5, a top cover 300 may go on top of the pad 200 to protect the pad 200 from the large animal and give a substantially smooth even surface. A bottom cover, which may be an extension of the top cover 300, may be used underneath the cushioning device to reduce abrasion against the concrete of the stall or any other place where the cushioning device is placed.

Delivery and Installation of the Cushioning Device

A cushioning device that may be filled with a compound such as SAP and liquid solution may present many advantages, including individually packaging the cushioning devices in such a way as to ensure ease of transport of the cushioning devices and a small overall size thereof.

As such, in other embodiments, the present invention also provides for kits and methods of transporting, distributing or shipping the cushioning devices of the present invention.

In one embodiment, the present invention provides for a kit comprising (a) a cushioning device according to one embodiment of the present invention and (b) a compound capable of creating a gelatinous filling material when in contact with a liquid solution such as water. The kit may also comprise instructions on how to install and/or care for the cushioning device. The kit may also comprise a cover for covering said cushioning device. The kit may also comprise a layer of protection for under the said cushioning device.

In another embodiment, the present invention also provides for methods of transporting, delivering, distributing or shipping a cushioning device to a site, such as a stall in a farm or a distributor of the cushioning device. These methods may be particularly useful to keep the shipping volumes and weights to a minimum. One such method of transporting a cushioning device to a site may comprise delivering to the site the cushioning device with an amount of a compound capable of creating a gel when in contact with a liquid already disposed within the chamber. The amount of compound to be used would depend at least on the compound being used, and the dimensions of the chamber. For example, the dimensions may create a chamber that can hold approximately 100 liters of water, and a certain SAP can absorb a ratio of 1:100 by weight. In this case, the amount of SAP needed may be about 1 kg. The cushioning device with the compound disposed in the chamber may, for example, be packaged in a container for transportation to the site. At the installation site an amount of the liquid may be introduced into the chamber thereby creating the gel within the chamber and installing the cushioning device at the site.

Alternatively, the cushioning device and an amount of the compound capable of creating a gel upon contact with a liquid may be delivered separately to the site (i.e. the compound is not disposed within the chamber). The cushioning device and the amount of compound may, for example, be packaged in a container for transportation to the site. The compound may be provided, for example, in a plastic bag. The amount of compound to be delivered may depend, as provided before, at least on the compound being used and the dimensions of the chamber. At the remote site the compound may be disposed within the chamber and the chamber may then be filled with an amount of liquid to create the gel within the cushioning device.

Filling Instructions

Once the compound capable of creating a gel is disposed within the chamber of the cushioning device, the chamber may then be filled with a liquid such as water, while air may be removed from the chamber. This may be accomplished in several different ways. The chamber may be filled with the liquid in a surface having a small slope to help the air to rise. However, this slope may probably not be enough to get all of the air out of the chamber. Alternatively, the side of the cushioning device having the filling port may be lifted to help the air rise and escape through the port. Another possibility may be to fill the cushioning device in a substantially vertical position so that the air automatically comes to the surface.

When filling the cushioning device, a balance between the comfort of the large animal such as a cow or a horse, and the clean-ability of the surface of the cushioning device may be maintained. Clean-ability affects the work input for the farmer and the hygiene for the cow. Both comfort and hygiene can affect the milk production levels of a cow.

The inventors discovered that a preferable balance between comfort and clean-ability may be achieved when the chamber of the cushioning device has a positive pressure, that is a positively past the atmospheric pressure. This pressure within the chamber may range from about 0.1 psi to about 8 psi. This positive pressure may ensure that, for example, when there is not a cow in the stall, the mat or mattress of the invention may remain in the fully inflated form without any indentations or low spots. When there are no indentations or low spots, the mattress may be easier to clean and the liquid matter may drain properly. However, within this range of positive pressure, since the large animals are heavy, they may still be capable of indenting the mattress, which is critical for animal comfort.

Depending on the material being used to manufacture the cushioning device, such as a mattress, there may be some elastic and some permanent stretch in the material. In a preferred configuration, reinforced PVC may be used with internal glue and threads for the construction. This leads to a mattress having a relatively small amount of permanent stretch after it is first used. Thus, in order to maintain the positive pressure (as described above), the mattress may need an extra preload during installation. The preload may vary depending on the material of the mattress, but for the preferred configuration, the preload may be about 2 psi. Thus the installation pressure in the cushioning device may be between about 2.1 psi and about 8 psi. It is expected that this preload installation pressure may drop to a desired final pressure during the first month of use of the cushioning device.

To achieve the right pressure within the cushioning device of the present invention, an installer may use a manual valve with a pressure gauge to achieve the right pressure. The air may be eliminated with a tee and another valve. An additional benefit may include an automatic air vent. The pressure may be achieved automatically using a pressure regulator.

The above disclosure generally describes the present invention. Changes in form and substitution of equivalents are contemplated as circumstances may suggest or render expedient. Although specific terms have been employed herein, such terms are intended in a descriptive sense and not for purposes of limitation. Other variations and modifications of the invention are possible. As such modifications or variations are believed to be within the sphere and scope of the invention as defined by the claims appended hereto.

The embodiments of the invention in which an exclusive property or privilege is claimed are defined as follows:

1. A dairy cattle cushioning device, wherein said dairy cattle cushioning device comprises a top exterior surface defining a supporting area for the dairy cattle, the supporting area of the top exterior surface is a generally flat shape, a bottom exterior surface, said top exterior surface and bottom exterior surface forming a chamber, and an amount of gelatinous filling material disposed within the chamber, wherein the gelatinous filling material exerts a pressure against the top and bottom exterior surfaces such that before use by a dairy cattle said top exterior surface stretches up to about 10% of its original size, the cushioning device having an installation pressure within the chamber, said installation pressure being from about 2 psi to about 8 psi such that after use by a dairy cattle the supporting area of the top exterior surface returns to its generally flat shape.

2. The dairy cattle cushioning device of claim 1, wherein said chamber is sealed.

3. The dairy cattle cushioning device of claim 1, wherein said gelatinous filling material is obtained by mixing a compound capable of creating a gel when in contact with a liquid.

4. The dairy cattle cushioning device of claim 3, wherein the compound capable of creating the gel is a superabsorbent polymer (SAP).

5. The dairy cattle cushioning device of claim 4, wherein said cushioning device is a mattress.

6. The dairy cattle cushioning device of claim 4, wherein said dairy cattle is a cow, a horse, a sheep, a buffalo or a goat.

7. The dairy cattle cushioning device of claim 3, wherein said cushioning device further comprises a nozzle, said nozzle having one port in communication with the chamber, said port for disposing the compound within the chamber and for filling the chamber with the liquid.

8. The dairy cattle cushioning device of claim 3, wherein said cushioning device further comprises a nozzle, said nozzle having a compound and liquid filling port and an air removing port.

9. The dairy cattle cushioning device of claim 3, wherein said cushioning device further comprises a compound and liquid filling nozzle and an air removing nozzle, each of said two nozzles having at least one port in communication with the chamber, wherein at least one port is a compound and liquid filling port, and at least one port is an air removing port.

10. The dairy cattle cushioning device of claim 1, wherein said top surface includes a pattern, wherein said cushioning device further comprises a flexible pad positioned atop of the top exterior surface of the cushioning device, said flexible pad comprising a substantially flat top surface and a bottom surface, said bottom surface conforms to the pattern of the top exterior surface of the cushioning device.

11. The dairy cattle cushioning device of claim 1, wherein said cushioning device further comprises a cover that covers the top and bottom exterior surfaces of the cushioning device.

12. The dairy cattle cushioning device of claim 1, wherein said cushioning device is a mattress.

13. The dairy cattle cushioning device of claim 1, wherein said dairy cattle is a cow, a horse, a sheep, a buffalo or a goat.

* * * * *